United States Patent
Kim et al.

(10) Patent No.: US 11,270,694 B2
(45) Date of Patent: Mar. 8, 2022

(54) ARTIFICIAL INTELLIGENCE APPARATUS AND METHOD FOR RECOGNIZING SPEECH BY CORRECTING MISRECOGNIZED WORD

(71) Applicant: LG ELECTRONICS INC., Seoul (KR)

(72) Inventors: Jaehong Kim, Seoul (KR); Heeyeon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 150 days.

(21) Appl. No.: 16/693,132

(22) Filed: Nov. 22, 2019

(65) Prior Publication Data

US 2021/0118436 A1 Apr. 22, 2021

(30) Foreign Application Priority Data

Oct. 21, 2019 (KR) .................. 10-2019-0130900

(51) Int. Cl.
*G10L 15/00* (2013.01)
*G10L 15/197* (2013.01)
(Continued)

(52) U.S. Cl.
CPC .......... *G10L 15/197* (2013.01); *G06N 3/0472* (2013.01); *G06N 3/08* (2013.01); *G10L 15/02* (2013.01); *G10L 15/16* (2013.01); *G10L 15/187* (2013.01); *G10L 15/1815* (2013.01); *G10L 15/22* (2013.01); *G10L 2015/025* (2013.01); *G10L 2015/223* (2013.01)

(58) Field of Classification Search
CPC ....... G10L 15/197; G10L 15/02; G10L 15/16; G10L 15/1815; G10L 15/187; G10L 15/22; G06N 3/0472; G06N 3/08
See application file for complete search history.

(56) References Cited

U.S. PATENT DOCUMENTS

| | | | |
|---|---|---|---|
| 2003/0110030 A1* | 6/2003 | Gschwendtner | G10L 15/22 704/235 |
| 2008/0133219 A1* | 6/2008 | Doulton | H04M 3/5183 704/8 |

(Continued)

*Primary Examiner* — Edgar X Guerra-Erazo
*Assistant Examiner* — Darioush Agahi
(74) *Attorney, Agent, or Firm* — Lee Hong Degerman Kang & Waimey

(57) ABSTRACT

An artificial intelligence apparatus for recognizing speech by correcting misrecognized word includes a microphone and a processor. The processor is configured to obtain, via the microphone, speech data including speech of a user, convert the speech data into text by using an acoustic model and a language model, determine whether an uncertain recognition exists in an acoustic recognition result according to the acoustic model, determine whether the converted text is a normal sentence by using a natural language processing model if an uncertain recognition exists in the acoustic recognition result, determine a sentence most similar to the converted text among sentences pre-learned by using the language model if the converted text is not a normal sentence, replace the converted text with the determined most similar sentence, and generate a speech recognition result corresponding to the speech data by using the converted text.

12 Claims, 14 Drawing Sheets

(51) Int. Cl.
*G10L 15/02* (2006.01)
*G10L 15/22* (2006.01)
*G10L 15/187* (2013.01)
*G10L 15/16* (2006.01)
*G06N 3/04* (2006.01)
*G06N 3/08* (2006.01)
*G10L 15/18* (2013.01)

(56) References Cited

U.S. PATENT DOCUMENTS

| | | | |
|---|---|---|---|
| 2014/0074475 A1* | 3/2014 | Kitade | G10L 15/01 704/251 |
| 2015/0332675 A1* | 11/2015 | Yasuda | A47L 9/2847 15/319 |
| 2016/0253989 A1* | 9/2016 | Kuo | G10L 15/183 704/257 |
| 2017/0193038 A1* | 7/2017 | Zhang | G06F 40/205 |
| 2018/0068653 A1* | 3/2018 | Trawick | G10L 15/142 |
| 2020/0027452 A1* | 1/2020 | Rangarajan | B60K 35/00 |
| 2020/0074993 A1* | 3/2020 | Lee | G06F 40/30 |

* cited by examiner

FIG. 11
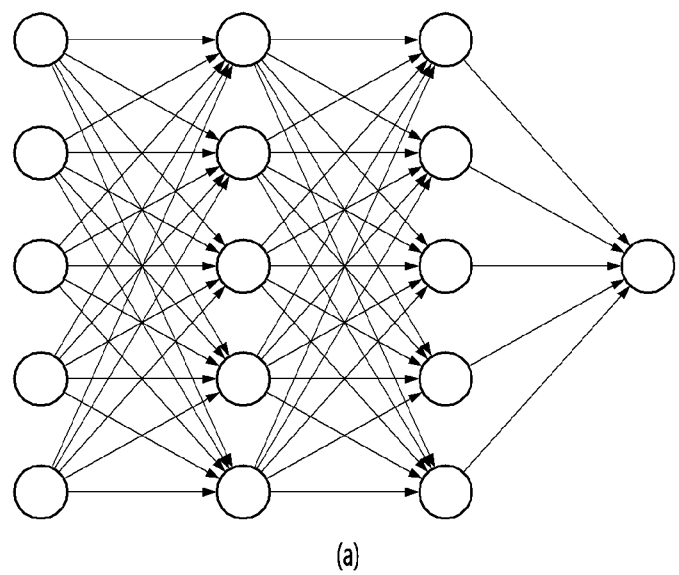
(a)
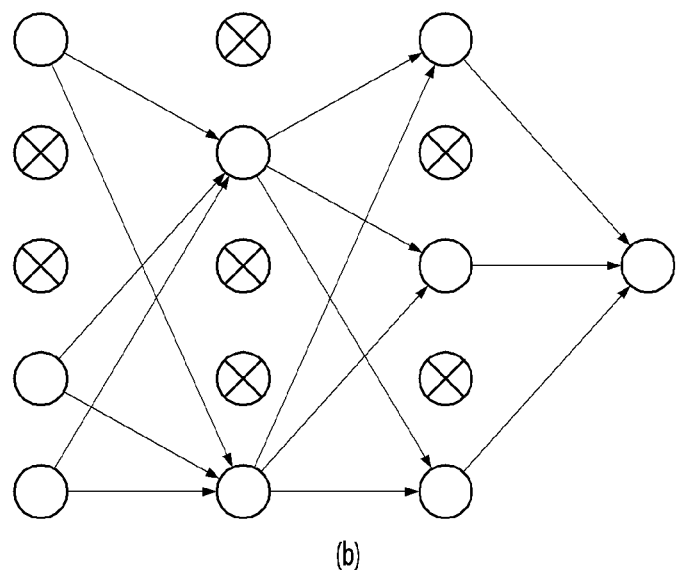
(b)

ARTIFICIAL INTELLIGENCE APPARATUS AND METHOD FOR RECOGNIZING SPEECH BY CORRECTING MISRECOGNIZED WORD

CROSS-REFERENCE TO RELATED APPLICATIONS

Pursuant to 35 U.S.C. § 119(a), this application claims the benefit of earlier filing date and right of priority to Korean Patent Application No. 10-2019-0130900, filed on Oct. 21, 2019, the contents of which are hereby incorporated by reference herein in its entirety.

BACKGROUND

The present disclosure relates to an artificial intelligence apparatus and a method for recognizing speech by correcting misrecognized word. Specifically, the present disclosure relates to an artificial intelligence apparatus and a method for determining whether a misrecognition has occurred in an acoustic model and recognizing speech by correcting misrecognized word in the acoustic model.

Recently, apparatuses for performing control by receiving sound are increasing. Apparatuses such as artificial intelligence speakers or smartphones for providing a speech recognition function recognize speech uttered by users and perform control corresponding to a result of recognition or provide a response.

A recognition model for speech recognition includes an acoustic model (AM), a language model (LM), and a natural language processing (NLP) model. If a misrecognition occurs in an acoustic model, speech recognition is highly likely to fail even if the performance of the language model and the natural language processing model is excellent. Therefore, there is a need to improve speech recognition performance by determining whether a misrecognition has occurred in an acoustic model and correcting the misrecognition.

SUMMARY

The present disclosure provides an artificial intelligence apparatus and a method for determining whether a misrecognition has occurred in an acoustic model and recognizing speech by correcting misrecognized word if the misrecognition has occurred in the acoustic model.

One embodiment of the present disclosure provides an artificial intelligence apparatus and a method for the same, in which speech data including speech of a user is obtained, it is determined whether an uncertain recognition exists in an acoustic recognition result using an acoustic model, it is determined whether a sentence converted (recognized) into text is a normal sentence using a natural language processing model if an uncertain recognition exists in the acoustic recognition result, an uncertain recognition is determined as a misrecognition if the recognized sentence is not a normal sentence, and the sentence converted into the text using the language model is replaced with a sentence most similar to the sentence converted into the text among pre-learned sentences to thereby correct the misrecognized word.

One embodiment of the present disclosure provides an artificial intelligence apparatus and a method for the same, in which in order to determine if an uncertain recognition exists in an acoustic recognition result, word recognition reliability is calculated for each word for determining phonemes using an acoustic model, and a word having a word recognition reliability lower than a predetermined reference value is determined as an uncertainly recognized word.

One embodiment of the present disclosure provides an artificial intelligence apparatus and a method for the same, in which probabilities corresponding to each phoneme are calculated for each predetermined window unit with respect to the speech data using an acoustic model, and word recognition reliability for each word is calculated using at least one of the largest probability value p1 among the calculated probabilities and the difference between the largest probability value p1 and the second largest probability value p2.

One embodiment of the present disclosure provides an artificial intelligence apparatus and a method for the same, in which if an uncertain recognition exists in an acoustic recognition result, a dropout intention information set is generated from text converted from speech data by applying a dropout technique to a natural language processing model, a ratio of intention information that is the same as intention information generated from a natural language processing model to which the dropout technique is not applied among pieces of dropout intention information included in the dropout intention information set is calculated, and it is determined whether the converted text is a normal sentence.

One embodiment of the present disclosure provides an artificial intelligence apparatus and a method for the same, in which if it is determined that the converted text is not a normal sentence, the converted text is divided into a normal recognition region and a misrecognition region based on word recognition reliability calculated for each word, a language model is used to select sentences that are similar to the normal recognition region among the previously learned sentences, the sentence most similar to the recognition region is determined among the selected sentences, and the determined sentence is replaced with the converted text to thereby correct the misrecognized word.

The details of one or more embodiments are set forth in the accompanying drawings and the description below. Other features will be apparent from the description and drawings, and from the claims.

BRIEF DESCRIPTION OF THE DRAWINGS

FIG. 11 is a view illustrating a dropout technique in an artificial neural network.

DETAILED DESCRIPTION OF THE EMBODIMENTS

Figure 1:
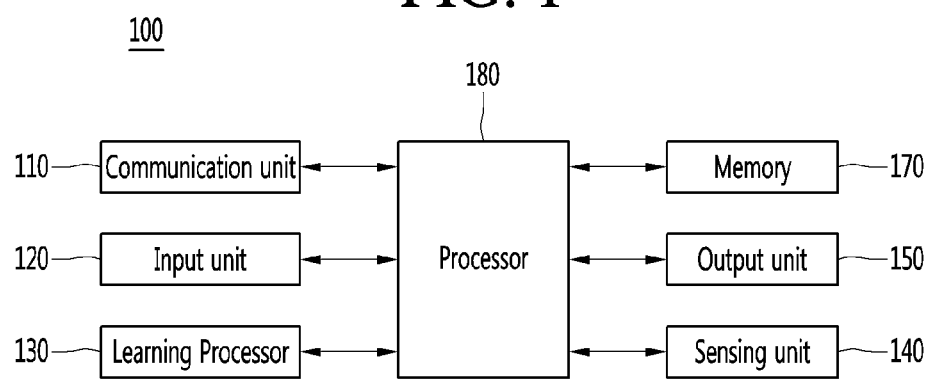
FIG. 1 is a block diagram illustrating an AI apparatus according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the present disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present disclosure.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other AI apparatuses 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

Here, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

Here, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
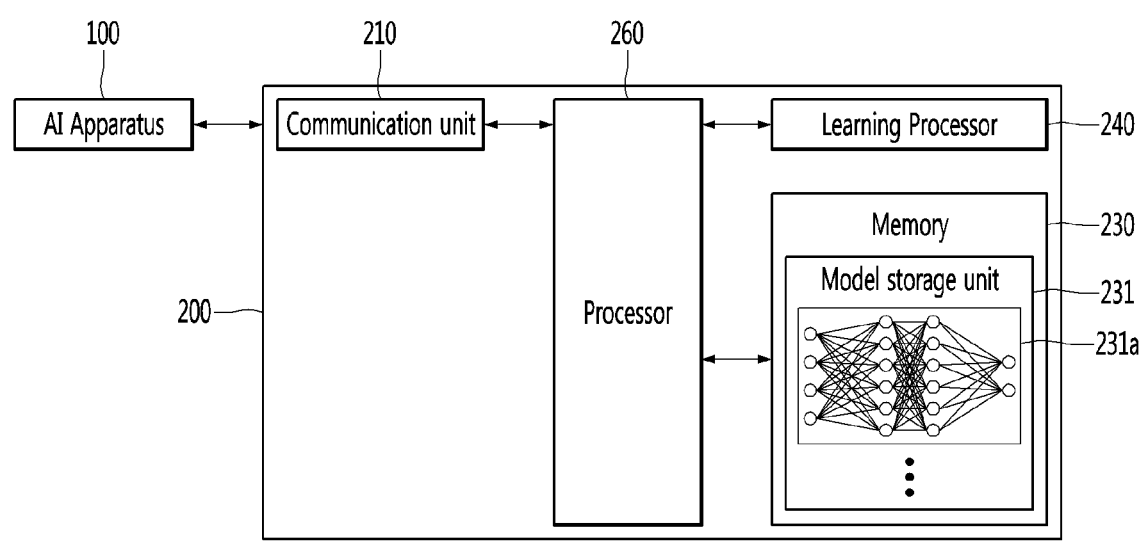
FIG. 2 is a block diagram illustrating an AI server according to an embodiment of the present disclosure.

FIG. 2 is a block diagram illustrating an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
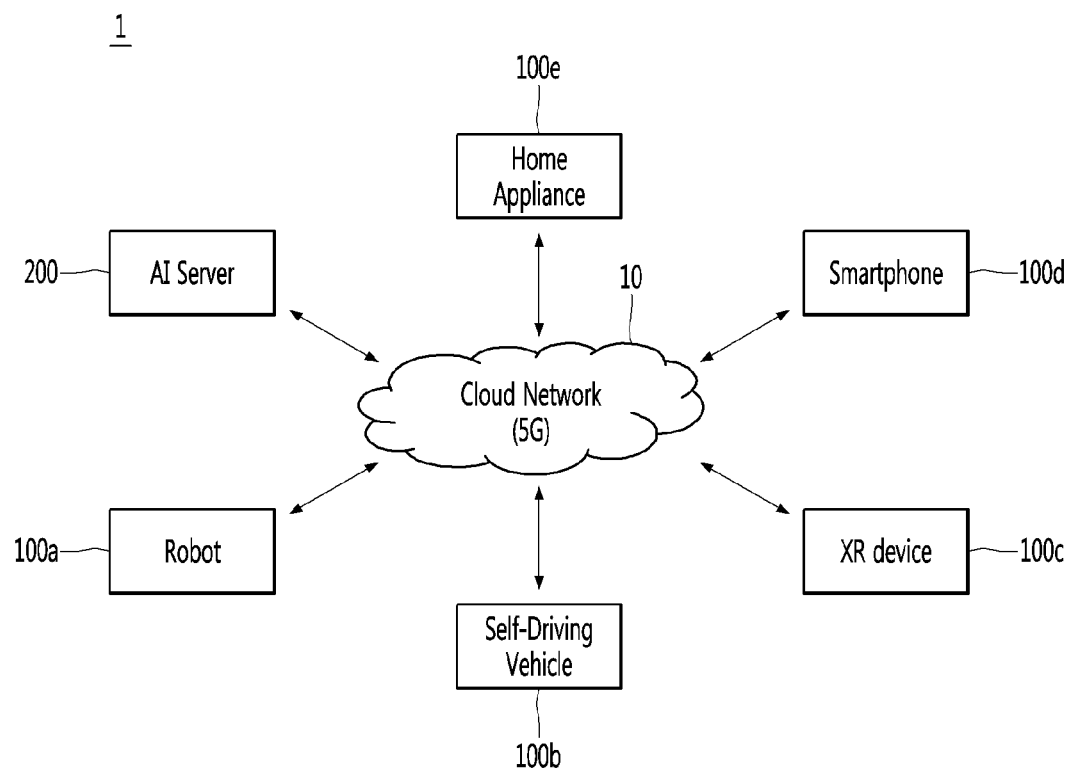
FIG. 3 is a view illustrating an AI system according to an embodiment of the present disclosure.

FIG. 3 is a view illustrating an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100*a* may use at least one of the map data, the object information detected from the sensor information, or the object information acquired from the external device to determine the travel route and the travel plan, and may control the driving unit such that the robot 100*a* travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving unit based on the control/interaction of the user. Here, the robot 100*a* may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the route and the travel plan, or may determine the operation.

Like the robot 100*a*, the self-driving vehicle 100*b* may use the sensor information acquired from at least one sensor among the lidar, the radar, and the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling route by using the recognized surrounding information or object information. The learning model may be learned directly from the self-driving vehicle 100*a* or may be learned from an external device such as the AI server 200.

Here, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external device to determine the travel route and the travel plan, and may control the driving unit such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving unit based on the control/interaction of the user. Here, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

Here, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given route without the user's control or moves for itself by determining the route by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
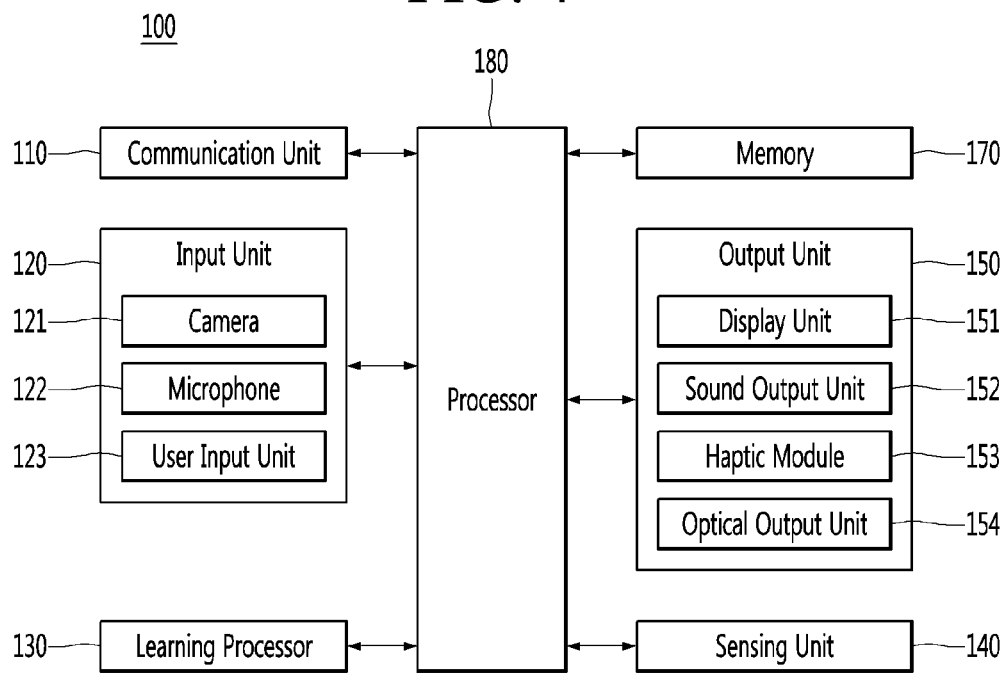
FIG. 4 is a block diagram illustrating an AI apparatus according to an embodiment of the present disclosure.

FIG. 4 is a block diagram illustrating an AI apparatus 100 according to an embodiment of the present disclosure.

The redundant repeat of FIG. 1 will be omitted below.

The communication unit 110 may also be referred to as a communication modem or a communication circuit.

Referring to FIG. 4, the input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the AI apparatus 100 to correspond to the inputted information.

The user input unit 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensing unit 140 may also be referred to as a sensor unit.

The output unit 150 may include at least one of a display unit 151, a sound output module 152, a haptic module 153, or an optical output module 154.

The display unit 151 may display (output) information processed in the AI apparatus 100. For example, the display unit 151 may display execution screen information of an application program running on the AI apparatus 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI apparatus 100 and a user, and an output interface between the AI apparatus 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
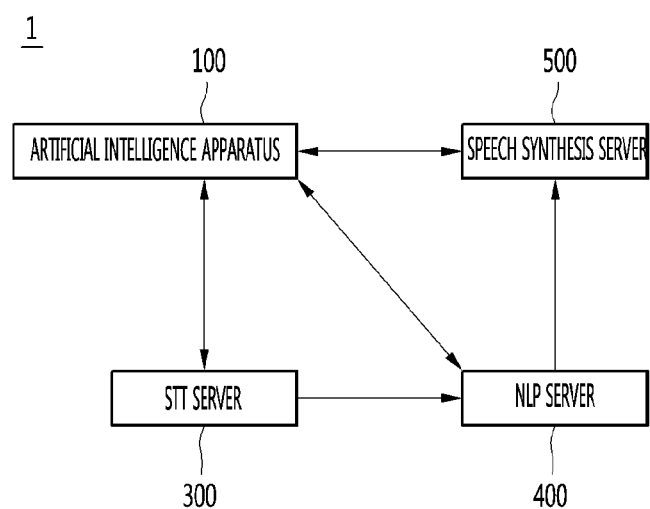
FIG. 5 is a block diagram illustrating an AI system according to an embodiment of the present disclosure.

FIG. 5 is a block diagram illustrating an AI system 1 according to an embodiment of the present disclosure.

Referring to FIG. 5, the AI system 1 may include an AI apparatus 100, a speech-to-text (STT) server 300, a natural language processing (NLP) server 400 and a speech synthesis server 500.

The AI apparatus 100 may transmit speech data to the STT server 300. The STT server 300 may convert the speech data received from the AI apparatus 100 into text data. The NLP server 400 may receive text data from the STT server 300. The NLP server 400 may analyze the intent of the text data based on the received text data. The NLP server 400 may transmit intent analysis information indicating the result of analyzing the intent to the AI apparatus 100 or the speech synthesis server 500. The speech synthesis server 500 may generate a synthesis speech reflecting the intent of the user based on the intent analysis information and transmit the generated synthesis speech to the AI apparatus 100.

The STT server 300 may increase accuracy of speech-to-text conversion using a language model. The language model may mean a model capable of calculating a probability of a sentence or calculating a probability of outputting a next word when previous words are given. For example, the language model may include probabilistic language models such as a unigram model, a bigram model and an N-gram model. The unigram is a model that assumes that all words are completely independent of each other and calculates a probability of a word sequence as a product of probabilities of words. The bigram model is a model that assumes that use of a word depends on only one previous word. The N-gram model is a model that assume that use of a word depends on previous (n−1) words.

That is, the STT server 300 may determine whether the converted text data is appropriately converted from the speech data using a language model, thereby increasing accuracy of conversion from the speech data into the text data.

The NLP server 400 may sequentially perform a morpheme analysis step, a syntax analysis step, a speech-act analysis step, an interaction processing step with respect to text data, thereby generating intent analysis information.

The morpheme analysis step refers to a step of classifying the text data corresponding to the speech uttered by the user into morphemes as a smallest unit having a meaning and determining the part of speech of each of the classified morphemes. The syntax analysis step refers to a step of classifying the text data into a noun phrase, a verb phrase, an adjective phrase, etc. using the result of the morpheme analysis step and determining a relation between the classified phrases. Through the syntax analysis step, the subject, object and modifier of the speech uttered by the user may be determined. The speech-act analysis step refers to a step of analyzing the intent of the speech uttered by the user using the result of the syntax analysis step. Specifically, the speech-act step refers to a step of determining the intent of a sentence such as whether the user asks a question, makes a request, or expresses simple emotion. The interaction processing step refers to a step of determining whether to answer the user's utterance, respond to the user's utterance or question about more information, using the result of the speech-act step.

The NLP server 400 may generate intent analysis information including at least one of the answer to, a response to, or a question about more information on the intent of the user's utterance, after the interaction processing step.

Meanwhile, the NLP server 400 may receive the text data from the AI apparatus 100. For example, when the AI apparatus 100 supports the speech-to-text conversion function, the AI apparatus 100 may convert the speech data into the text data and transmit the converted text data to the NLP server 400.

The speech synthesis server 500 may synthesize prestored speech data to generate a synthesized speech. The speech synthesis server 500 may record the speech of the user selected as a model and divide the recorded speech into syllables or words. The speech synthesis server 500 may store the divided speech in an internal or external database in syllable or word units.

The speech synthesis server 500 may retrieve syllables or words corresponding to the given text data from the database and synthesize the retrieved syllables or words, thereby generating the synthesized speech.

The speech synthesis server 500 may store a plurality of speech language groups respectively corresponding to a plurality of languages. For example, the speech synthesis server 500 may include a first speech language group recorded in Korean and a second speech language group recorded in English.

The speech synthesis server 500 may translate text data of a first language into text of a second language and generate a synthesized speech corresponding to the translated text of the second language using the second speech language group.

The AI system 1 may further include an AI server 200. The AI server 200 may learn at least one of an STT engine used in the STT server 300, an NLP engine used in the NLP server 400 or a speech synthesis engine used in the speech synthesis server 500. That is, at least one of the STT server 300, the NLP server 400 or the speech synthesis server 500 may use models or engines trained in the AI server 200.

Although the AI apparatus 100, the STT server 300, the NLP server 400 and the speech synthesis server 500 are shown as being divided in FIG. 5, the present disclosure is not limited thereto. In one embodiment, some of the AI server 200, the STT server 300, the NLP server 400 or the speech synthesis server 500 may be configured as one server. In one embodiment, some of the STT server 300, the NLP server 400 or the speech synthesis server 500 may be included in the AI apparatus 100. This means that the AI apparatus 100 performs the function of the STT server 300, the NLP server 400 or the speech synthesis server 500.

Figure 6:
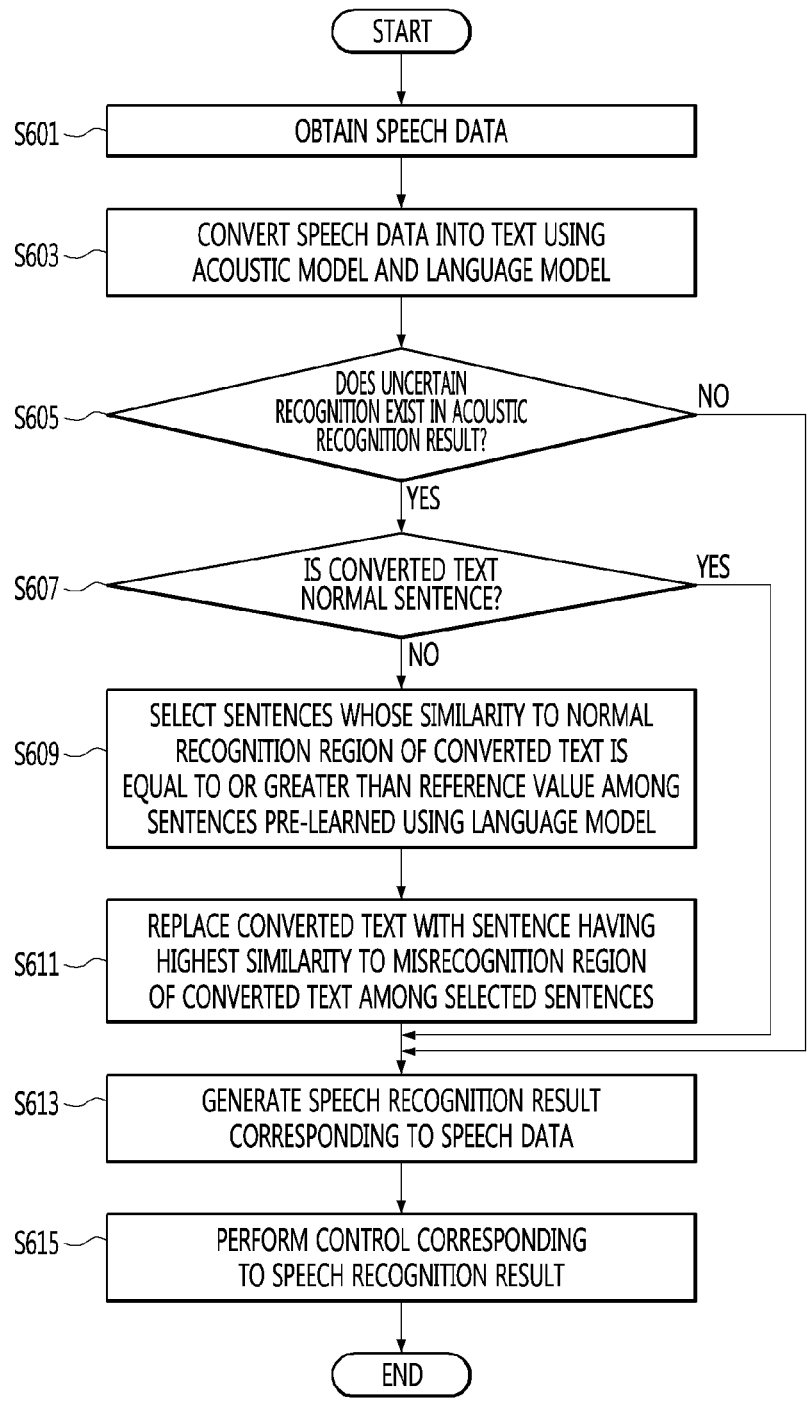
FIG. 6 is flowchart illustrating a method for recognizing speech by correcting misrecognized word according to an embodiment of the present disclosure.

FIG. 6 is a flowchart illustrating a method for recognizing speech by correcting misrecognized word according to an embodiment of the present disclosure.

Referring to FIG. 6, the processor 180 of the AI apparatus 100 obtains speech data including speech of a user (S601).

The processor 180 may obtain the speech data via the microphone 122 or receive the speech data from an external apparatus (not shown) via the communication unit 110.

The speech data may be obtained by converting a sound wave including the speech of the user into a digital signal. For example, the speech data may be an audio file in various formats such as pulse code modulation (PCM), wave or mp3.

The speech of the user may be uttered speech including a command for controlling the AI apparatus 100 and a query for searching for information.

The processor 180 may remove noise from the obtained speech data as preprocessing. The processor 180 may directly generate speech data, from which noise is removed, using a noise removal engine or a noise removal filter or transmit the sound data to the AI server 200 and receive the speech data, from which noise is removed. In addition, the volume of the speech data may be controlled according to a predetermined level. Control of the volume of the speech data may be regarded as part of the preprocessing. Hereinafter, the speech data may mean the speech data, from which noise is removed via preprocessing.

The processor 180 of the AI apparatus 100 converts the speech data into text by using an acoustic model and a language model (S603).

A speech recognition model used to recognize speech included in speech data may include a speech to text (STT) engine for converting speech data into text and a natural language processing (NLP) model for analyzing and extracting meaningful information from text. The STT engine may include an acoustic model (AM) and a language model (LM). At least one of the acoustic model, the language model, or the natural language processing model may be configured to include an artificial neural network and may be learned using a machine learning algorithm or a deep learning algorithm. In addition, at least one of the acoustic model, the language model, or the natural language processing model may be learned in the processor 180 or the learning processor 130 and stored in the memory 170, or may be learned in the processor 260 or the learning processor 240 of the AI server 200 and stored in the memory 230 of the AI server 200.

Recognizing the speech by using the speech recognition model may mean recognizing the sound of the speech data in phone or phoneme unit by using the acoustic model, recognizing words and sentences corresponding to the sound from the phoneme unit recognition result by using the language model, and obtaining semantic information or intention information corresponding to the recognized sentence using the natural language processing engine. That is, recognizing the speech by using the speech recognition model may include generating intention information corresponding to the speech by sequentially using the acoustic model, the language model, and the natural language processing model. In addition, converting the speech data into the text by using the acoustic model and the language model may include a process of recognizing words included in the speech data.

Hereinafter, the term "phone" and the term "phoneme" may be used interchangeably with each other, and the present disclosure also includes embodiments in which the term "phone" and the term "phoneme" are interchanged. Therefore, even if only the term "phoneme" is described below, the present disclosure includes an embodiment in which the term "phoneme" is replaced with the term "phone", unless specified otherwise, and vice versa.

The processor 180 may recognize the speech included in the speech data in a phoneme unit by using the acoustic model, recognize words included in the speech data from the recognition result of the phoneme unit by using the language model, and convert the speech data into the text based on the recognized words. The processor 180 may distinguish words included in the speech data from each other based on a blank or a silence.

If the processor 180 inputs the speech data in a predetermined window unit into the input layer of the acoustic model, the output layer of the acoustic model may output a probability that the input speech data of the window unit corresponds to each phoneme. For example, an output layer of a Korean acoustic model may output a probability that the input speech data of the window unit corresponds to the phoneme "ㄱ", a probability that the input speech data of the window unit corresponds to the phoneme "ㄴ", and the like.

The processor 180 may determine the phoneme corresponding to each window by selecting the phoneme with the highest probability among probabilities for each phoneme output from the acoustic model for each window, determine the word corresponding to the phonemes determined by using the language model, and convert the speech data into the text based on the determined word.

The window may refer to a certain frame. For example, the window may be set to a length of 10 ms, 20 to 40 ms, or the like.

In one embodiment, the processor 180 may calculate a power spectrum for each window or each frame with respect to the speech data. The calculation of the power spectrum may refer to periodogram spectral estimation. In addition, the processor 180 may convert the power spectrum to a Mel scale by applying a Mel filterbank to the calculated power spectrum. For example, the processor 180 may divide the interval of the Mel filterbank according to Equation 1 below. The processor 180 may determine the phone or the phoneme by inputting the Mel filterbank corresponding to each window to the acoustic model. In this case, the acoustic model may receive the Mel filterbank as an input feature vector.

$$M(f) = 1125\ln\left(1 + \frac{f}{700}\right) \quad \text{[Equation 1]}$$

In one embodiment, the processor 180 may apply a logarithmic and discrete cosine transform (DCT) to the filterbank corresponding to each window, select second to thirteenth coefficients from DCT values, and generate Mel frequency cepstral coefficient (MFCC). The processor 180 may determine the phone or the phoneme by inputting the MFCC corresponding to each window to the acoustic model. In this case, the acoustic model may receive the MFCC as an input feature vector.

The processor 180 of the AI apparatus 100 determines whether an uncertain recognition exists in the acoustic recognition result of the acoustic model (S605).

The processor 180 may calculate the word recognition reliability in the acoustic model in each word unit recognized from the speech data, and determine whether an uncertain recognition exists in the acoustic recognition result of the acoustic model based on the calculated word recognition reliability. To this end, the processor 180 may calculate the word recognition reliability for each word by using the acoustic model, and determine whether each word is uncertainly recognized, based on the calculated word recognition reliability. A detailed description thereof will be described below.

If it is determined in step S605 that an uncertain recognition exists in the acoustic recognition result, the processor 180 of the AI apparatus 100 determines whether the converted text is a normal sentence by using the natural language processing model (S607).

The processor 180 may determine whether the text converted from the speech data is a normal sentence capable of being learned in the natural language processing model to generate intention information by using the natural language processing model. To this end, the processor 180 may calculate the uncertainty of the converted text by using the natural language processing model, and determine whether the sentence is a normal sentence, based on the calculated uncertainty. A detailed description thereof will be described below. The natural language processing model may be learned in the processor 180 or the learning processor 130 and stored in the memory 170, or may be learned in the processor 260 or the learning processor 240 of the AI server 200 and stored in the memory 230 of the AI server 200.

That is, a situation in which it is determined that an uncertain recognition exists in the acoustic recognition result is assumed. In the above assumption, if the text converted from the speech data using the acoustic model and the language model is a normal sentence, an uncertain recognition existing in the acoustic recognition result may be regarded as a normal recognition. In contrast, in the above assumption, if the text converted from the speech data using the acoustic model and the language model is not a normal sentence, an uncertain recognition existing in the acoustic recognition result may be regarded as an abnormal normal recognition.

If it is determined in step S607 that the converted text is not a normal sentence, the processor 180 of the AI apparatus 100 selects sentences whose similarity to the normal recognition region of the converted text is equal to or greater than a reference value among existing learned sentences by using the language model (S609).

Since it is determined that an uncertain recognition exists in the acoustic recognition result according to the acoustic model and it is determined that the text converted from the speech data is not a normal sentence according to the natural language processing model, this case may refer to a situation in which a part determined by the acoustic model to be inaccurately recognized is inaccurately or incorrectly recognized by the acoustic model.

The processor 180 may use the language model to select sentences whose similarity to the normal recognition region of the converted text is high, that is, whose similarity is equal to or greater than a reference value, among the existing learned sentences. To this end, the processor 180 may divide the converted text into a normal recognition region and a misrecognition region based on the word recognition reliability calculated using the acoustic model.

The processor 180 may divide a region corresponding to an uncertain recognition existing in the acoustic recognition result determined in step S605 as the misrecognition region, and divide the other regions as the normal recognition region.

In particular, the processor 180 may select sentences whose similarity to the normal recognition region of the converted text is high among sentences having high use frequency or high preference based on the user's speech log or sentences related to the functions supported by the AI apparatus 100. For example, when the user frequently utters speech to request photographing by using the AI apparatus 100 and the AI apparatus 100 is linked to a specific IoT device, the processor 180 may select sentences whose similarity to the normal recognition region of the converted text is high among sentences related to interaction with the linked IoT device and sentences related to photographing that are frequently uttered by the user.

The processor 180 may calculate a similarity to the normal recognition region of the converted text with respect to the existing learned sentences using the language model, and select sentences whose similarity is equal to or greater than the reference value among the existing learned sentences. As a result, the selected sentence and the converted text may be the same or mostly the same, except for the misrecognition region of the converted text. For example, if the text converted from the speech data is "take three jellies." and the misrecognition region of the converted text is determined as "jellies", the processor 180 may select "take three selfies.", "take three photos.", And "take three pictures.", which are sentences similar to the normal recognition region of the converted text among the previously learned sentences using the language model.

The processor 180 of the AI apparatus 100 replaces the converted text with a sentence having the highest similarity to the misrecognition region of the converted text among the selected sentences (S611).

The sentences selected according to the previous step S609 are sentences similar to the region that is determined to be normally or successfully recognized from the speech data by using the acoustic model. However, for more accurate speech recognition, it is necessary to appropriately correct the misrecognition region incorrectly recognized from the speech data. To this end, the processor 180 may determine a sentence having the highest similarity to the misrecognition region of the converted text among the selected sentences, and replace the text converted from the speech data with the determined sentence.

The processor 180 may determine the most similar sentence among the selected sentences by determining a region corresponding to the misrecognition region of the converted text and comparing the misrecognition region with the region corresponding to the misrecognition region.

The processor 180 may calculate at least one of the Mel filterbank similarity, the MFCC similarity, or the length similarity between the misrecognition region of the converted text and the corresponding region in the selected sentence, and determine the sentence having the highest similarity.

If it is determined in step S605 that there is no misrecognition in the acoustic recognition result, if it is determined in step S607 that the converted text is a normal sentence, or if step S611 is performed, the processor 180 of the AI apparatus 100 generates a speech recognition result corresponding to the speech data from the converted text by using the natural language processing model (S613).

The processor 180 may generate the speech recognition result from the converted text by using the natural language processing model. The speech recognition result for the speech data may include the text converted from speech included in the speech data, semantic information corresponding to the converted text, or intention information. That is, generating the speech recognition result may mean generating speech data or intention information corresponding to the text converted from the speech data.

In one embodiment, the processor 180 may generate the speech recognition result by generating intention information corresponding to the converted text by using the natural language processing model stored in the memory 170.

In one embodiment, the processor 180 may transmit, via the communication unit 110, the text converted from the speech data to the AI server 200, the processor 260 of the AI server 200 may generate the speech recognition result by generating intention information corresponding to the received converted text by using the natural language processing model stored in the memory 230, and the AI apparatus 100 may receive, via the communication unit 110, the speech recognition result generated from the AI server 200.

If the intention information corresponding to the converted text is generated in step S607 of determining whether the converted text is a normal sentence, the already generated intention information may be used as the speech recognition result.

In addition, the processor 180 of the AI apparatus 100 performs control corresponding to the generated speech recognition result (S615).

If the speech recognition result is a control command for controlling the AI apparatus 100 or the external apparatus (not shown), the processor 180 may perform control corresponding to the control command. In particular, if the control command is a command for controlling the external apparatus (not shown), the processor 180 may generate a control signal for controlling the external apparatus (not shown) according to the control command and transmit the control signal to the external apparatus (not shown) via the communication unit 110. In addition, the processor 180 may output feedback on the control command to the user via the output unit 150 or transmit an output signal for outputting feedback on the control command to a user terminal (not shown) via the communication unit 110.

Similarly, if the speech recognition result is a query for requesting information, the processor 180 may generate response information corresponding to the query via the Internet. In addition, the processor 180 may output the generated response information via the output unit 150 or transmit an output signal for outputting the response information to the user terminal (not shown) via the communication unit 110.

The processor 180 may generate response speech for outputting the response information and audibly output the response speech via the sound output unit 152. Specifically, the processor 180 may generate a response sentence using a natural language generation (NLG) scheme, convert the generated response sentence into the response speech using a text-to-speech (TTS) engine, and output the converted response speech via the sound output unit 152.

Therefore, the AI apparatus 100 may determine whether the phoneme recognition using the acoustic model is accurate. If it is determined that the recognition using the acoustic model is inaccurate, the AI apparatus 100 may recognize the user's speech more accurately by correcting the inaccurately recognized part based on the accurately recognized parts.

Steps illustrated in FIG. 6 may be repeatedly performed, and accordingly, the AI apparatus 100 may repeatedly recognize the user's speech.

The order of the steps illustrated in FIG. 6 is merely an example, and the present disclosure is not limited thereto. That is, in some embodiments, the order of some of steps illustrated in FIG. 6 may be reversed. In addition, in one embodiment, some of steps illustrated in FIG. 6 may be performed in parallel.

Figure 7:
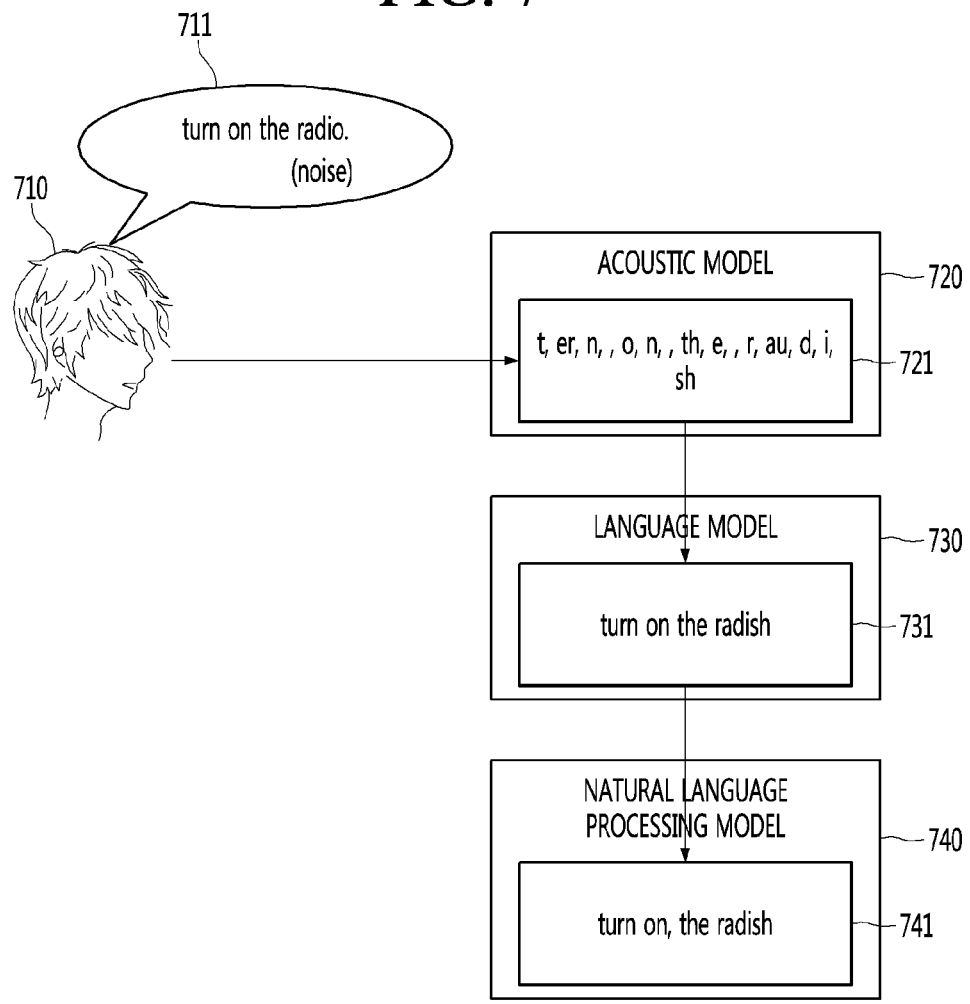
FIG. 7 is a view illustrating an example of a speech recognition process in a situation in which a user's speech is misrecognized in an acoustic model.

FIG. 7 is a view illustrating an example of a speech recognition process in a situation in which a user's speech is misrecognized in an acoustic model.

Referring to FIG. 7, a user 710 utters "turn on the radio." 711, and noise is included when the user 710 utters a word "radio." The example illustrated in FIG. 7 may include not only a situation in which noise is included when the user 710 utters the word "radio", but also a situation in which the user 710 incorrectly utters the word "radio." In addition, the example illustrated in FIG. 7 may include not only a situation in which noise is included when the user 710 utters the word "radio", but also a situation in which the acoustic model 720 is incorrectly learned although the user 710 correctly pronounces the uttered speech 711.

The processor 180 of the AI apparatus 100 may use the acoustic model 720 to determine the phonemes 721 corresponding to the speech 711 of the user 710 as [t, er, n, o, n, th, e, r, au, d, i, sh]. As such, if the word "radio" includes noise in the speech 711 itself, or if the word "radio" is inarticulately uttered, the acoustic model 720 may inaccurately determine the phonemes corresponding to the word "radio" as [r, au, d, i, sh].

The processor 180 of the AI apparatus 100 may convert the speech 711 into the text by determining words 731 corresponding to the phonemes 721 determined using the language model 730. However, since the acoustic model 720 inaccurately recognizes the phonemes 721 corresponding to the speech 711 in the acoustic model 720, the language model 730 may inaccurately determine the words 731 as "turn on the radish."

The processor 180 of the AI apparatus 100 may generate the speech recognition result corresponding to the speech 711 by determining intention information 741 corresponding to the words 731 determined using the natural language processing model 740. However, since the words 731 corresponding to the speech 711 determined by the language model 730 are "turn on the radish", the natural language processing model 740 may determine intention information corresponding to the speech 711 as "turn on" and "the radish."

As such, in a situation in which the recognition of the phonemes 721 using the acoustic model 720 of the user 710 is inaccurate, it is difficult to guarantee the accuracy of speech recognition regardless of the performance of the language model 730 and the natural language processing model 740. However, according to the above-described method for recognizing speech, it may be determined that the phonemes 721 are misrecognized in the acoustic model 720, and the speech can be recognized more accurately by correcting the misrecognized part.

Figure 8:
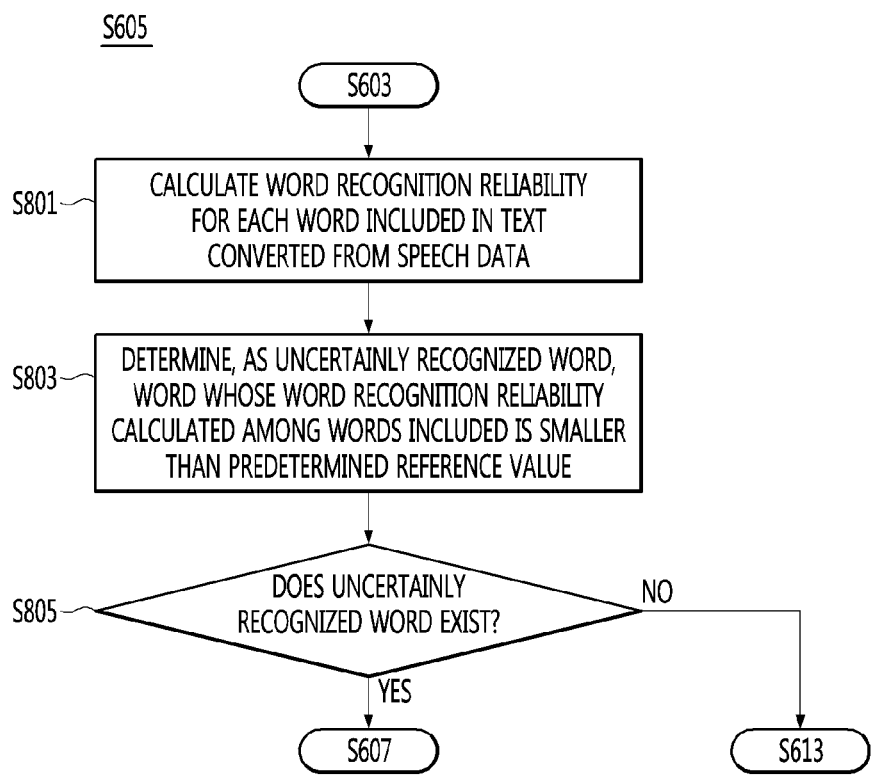
FIG. 8 is a flowchart illustrating an example of step S605 of determining whether an uncertain recognition exists in an acoustic recognition result illustrated in FIG. 6.

FIG. 8 is a flowchart illustrating an example of step S605 of determining whether an uncertain recognition exists in an acoustic recognition result illustrated in FIG. 6.

Referring to FIG. 8, the processor 180 of the AI apparatus 100 calculates word recognition reliability for each word included in the text converted from the speech data (S801).

The word recognition reliability may refer to how high reliable the words recognized using the acoustic model is recognized.

The acoustic model may outputs the probability that the speech data, Mel filterbank, or MFCC input in window units will correspond to each phoneme, and the processor 180 may determine a phoneme having the highest probability value among the probabilities output from the output layer of the acoustic model as the phoneme corresponding to the input speech data, Mel filterbank, or MFCC.

Among the probabilities for the phonemes output from the output layer of the acoustic model, the largest probability value may be referred to as p1, and the second largest probability value may be referred to as p2. The phoneme corresponding to p1 may be referred to as first-ranking phoneme, and the phoneme corresponding to p2 may be referred to as second-ranking phoneme. As p1 is larger or the difference between p1 and p2 (or p1−p2) is larger, it may be determined that the acoustic model has recognized the phoneme corresponding to the input speech data with higher accuracy. Since that p1 is large means that the first-ranking phoneme has a high probability that will correspond to the input speech data of the window unit, therefore, it can be seen that the first-ranking phoneme corresponds to the speech data of the window unit input with high reliability. In addition, since that the difference p1 and p2 is large means that the second-ranking phoneme has a low probability that will correspond to the input speech data of the window unit as compared with the first-ranking phoneme, likewise, it can be seen that the first-ranking phoneme corresponds to the speech data of the window unit input with high reliability.

Similarly, the processor 180 may calculate entropy for the output layer of the acoustic model. As the calculated entropy is smaller, it may be determined that the acoustic model recognizes the phoneme corresponding to the input speech data of the window unit with higher accuracy.

The processor 180 may obtain p1 or p1−p2 corresponding to the phonemes by inputting speech data of window unit, Mel filterbank, or MFCC to the acoustic model, and calculate the word recognition reliability corresponding to the recognized word based on at least one of p1 or p1−p2 corresponding to the phonemes included in the recognized word from the recognition result of the phoneme unit. For example, when calculating the word recognition reliability for the word "house", the processor 180 may input speech data including the word "house" to the English acoustic model in window units, obtain p1 or p1−p2 corresponding to the phonemes of the word "house" (e.g., "hh", "aw", "s") from the English acoustic model, and calculate the word recognition reliability by using at least one of p1 or p1−p2 corresponding to the phonemes.

The processor 180 may determine the word recognition reliability of each word as an average of p1 for the phonemes of the word. For example, in the process of calculating the word recognition reliability for the word "house" recognized from the English acoustic model, if the first-ranking phoneme corresponding to the first window is "hh", p1 corresponding to the first window is 0.79, the first-ranking phoneme corresponding to the second window is "aw", p1 corresponding to the second window is 0.67, the first-ranking phoneme corresponding to the third window is "s", and p1 corresponding to the third window is 0.65, the processor 180 may determine the word recognition reliability for the word "house" recognized from the English acoustic model as 0.703, which is an average of p1 corresponding to each window.

Alternatively, the processor 180 may determine the word recognition reliability of each word as an average of p1−p2 for the phonemes of the word. For example, in the process of calculating the word recognition reliability for the word "house" recognized from the English acoustic model, if the first-ranking phoneme corresponding to the first window is "hh", (p1, p2) corresponding to the first window is (0.79, 0.33), the first-ranking phoneme corresponding to the second window is "aw", (p1, p2) corresponding to the second window is (0.67, 0.24), the first-ranking phoneme corresponding to the third window is "s", and (p1, p2) corresponding to the third window is (0.65, 0.30), the processor 180 may determine the word recognition reliability for the word "house" recognized from the English acoustic model as 0.413, which is an average of p1−p2 corresponding to each window.

Alternatively, the processor 180 may calculate the word recognition reliability of the specific word by multiplying the average of p1 for phonemes (or windows) of the specific word by a predetermined first reliability coefficient, or multiplying the average of p1−p2 for phonemes by a predetermined second reliability coefficient. For example, if the second reliability coefficient is 2 on the assumption that the word "house" is recognized from the English acoustic model, the processor 180 may determine the word recognition reliability for the word "house" recognized from the English acoustic model as 0.826 by multiplying the second confidence coefficient 2 by 0.413, which is the average of p1−p2 corresponding to each window. The first reliability coefficient or the second reliability coefficient may be a value that is set in advance or a value that is set by a user input.

Alternatively, the processor 180 may calculate the word recognition reliability of the specific word by multiplying the average of p1 for phonemes (or windows) of the specific word by a predetermined first weight value, multiplying the average of p1−p2 for phonemes by a predetermined second weight value, and summing the multiplication results. For example, if the first weight value is 0.5 and the second weight value is 0.5 on the assumption that the word "house" is recognized from the English acoustic model, the processor 180 may determine the word recognition reliability for the word "house" recognized from the English acoustic model as 0.558(=0.703*0.5+0.413*0.5) by performing the weighted sum on 0.703, which is the average of p1 corresponding to each window, and 0.413, which is the average of p1−p2. The first weight value and the second weight value may be values that are set in advance or value that are set by a user input.

The processor 180 of the AI apparatus 100 determines, as an uncertainly recognized word, a word whose word recognition reliability calculated among words included in the converted text is smaller than a predetermined reference value (S803).

At least one word is included in the converted text, and word recognition reliability indicating recognition reliability using the acoustic model is calculated for each word. If the calculated word recognition reliability is low, this may mean that the word is uncertainly recognized in the acoustic model.

That the word is uncertainly recognized in the acoustic model merely means that the acoustic model has uncertainly determined the phonemes constituting the word with low confidence, and does not mean that the phonemes have been misrecognized. That is, if the speech data corresponding to an untrained pronunciation is input to the acoustic model, the acoustic model infers phonemes corresponding to unlearned pronunciations. Therefore, the reliability of the inference is low.

The processor 180 may determine whether the calculated word recognition reliability for each word is equal to or greater than a predetermined reference value, and determine, as an uncertainly recognized word, a word whose calculated word recognition reliability is less than the predetermined reference value.

The processor 180 of the AI apparatus 100 determines whether an uncertainly recognized word exists (S805).

The presence of the uncertainly recognized word may mean that an uncertain recognition exists in the acoustic recognition result of the acoustic model.

If it is determined in step S805 that an uncertainly recognized word exists, the processor 180 of the AI apparatus 100 performs step S607 illustrated in FIG. 6.

If it is determined in step S805 that an uncertainly recognized word does not exist, the processor 180 of the AI apparatus 100 performs step S613 illustrated in FIG. 6.

The order of the steps illustrated in FIG. 8 is merely an example, and the present disclosure is not limited thereto. That is, in one embodiment, some of steps illustrated in FIG. 8 may be performed in parallel.

Figure 9:
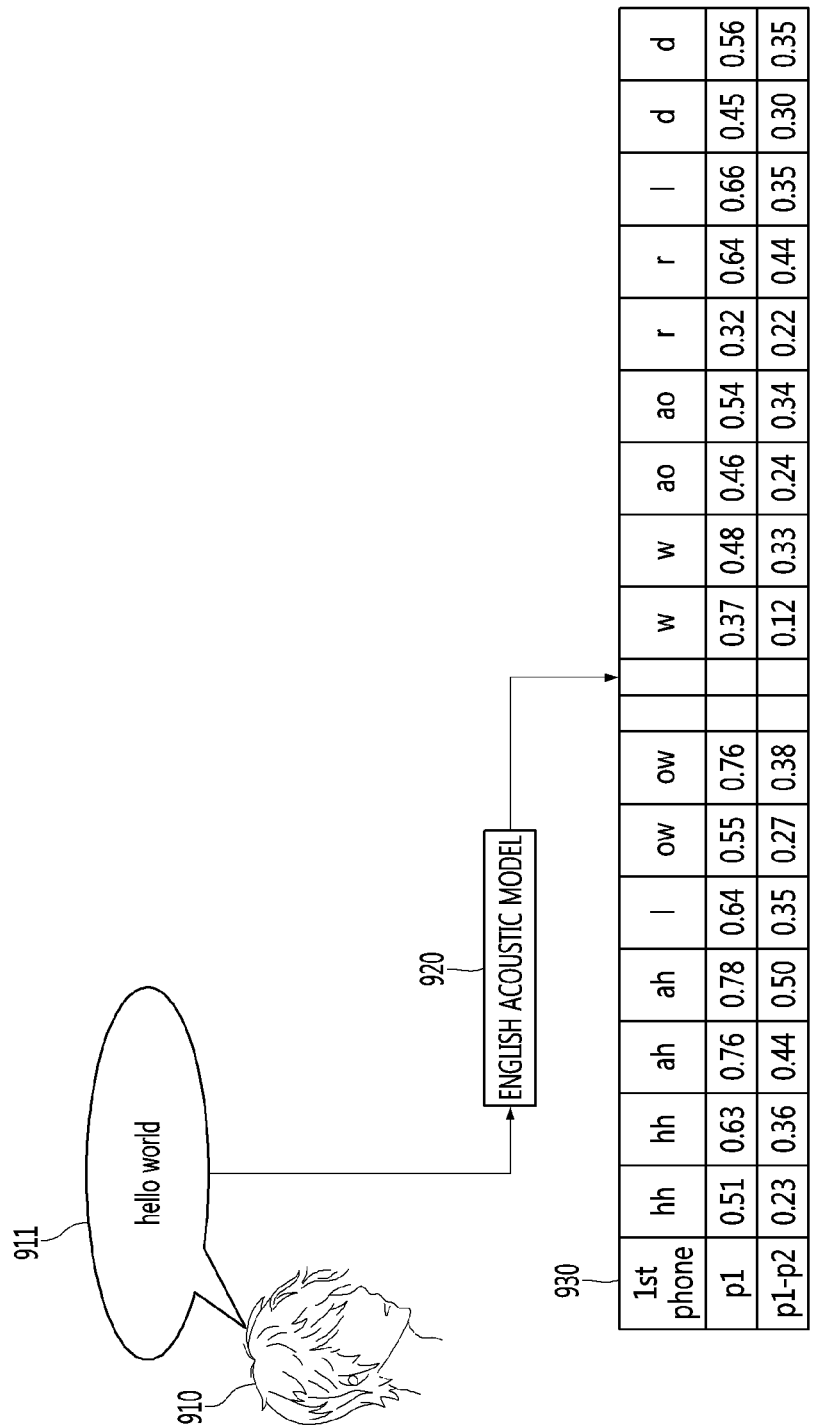
FIG. 9 is a view illustrating an example of calculating word recognition reliability according to an embodiment of the present disclosure.

FIG. 9 is a view illustrating an example of calculating word recognition reliability according to an embodiment of the present disclosure.

Referring to FIG. 9, a user 910 may utter "hello world" 911 in English.

The processor 180 may calculate a probability for each phone for each predetermined window unit using the English acoustic model 920 with respect to the speech 911 of the user 910.

Specifically, the processor 180 may input speech data corresponding to the speech 911 to the English acoustic model 920 in predetermined window units, the English acoustic model 920 may calculate a probability corresponding to each phone for each input window unit (930), and may determine phones corresponding to the speech 911 based on a probability 930 corresponding to each phone calculated for each window unit.

According to the English acoustic model 920, the first-ranking phone or the first phone recognized from the speech data corresponding to the speech 911 of the user 910 is sequentially "hh", "hh", "ah", "ah", "l", "ow", "ow", ",", ",", ",", "w", "w", "ao", "ao", "r", "r", "l", "d", and "d". The processor 180 may distinguish words from each other based on a blank or a silence. Therefore, the speech data corresponding to the speech 911 may be distinguished into first phones "hh", "hh", "ah", "ah", "l", "ow", and "ow" corresponding to the first word, and first phones "w", "w", "ao", "ao", "r", "r", "l", "d", and "d" corresponding to the second word. Thereafter, the processor 180 may determine words corresponding to the first phones determined for each word as "hello" and "world" using the language model.

If each word is recognized from the speech data corresponding to the speech 911, the processor 180 may calculate the word recognition reliability based on at least one of p1 for each word or a difference between p1 and p2 for each word. For example, the processor 180 may determine 0.66 (=(0.51+0.63+0.76+0.78+0.64+0.55+0.76)/7), which is the average of p1 values in phones corresponding to the word "hello", as the word recognition confidence of the word "hello," and may determine 0.36 (=(0.23+0.36+0.44+0.50+0.35+0.27+0.38)/7), which is the average of (p1−p2) values in the phones corresponding to the word "hello", as the word recognition reliability corresponding to the word "hello". Alternatively, the processor 180 may determine the weighted sum of the average of p1 values in the phones corresponding to each word and the average of (p1−p2) values as word recognition reliability corresponding to each word.

Alternatively, if each word is recognized from the speech data corresponding to the speech 911, the processor 180 may calculate entropy and calculate word recognition reliability based on the calculated entropy. For example, since entropy can be calculated as a real number of 0 or more, the processor 180 may determine a reciprocal of a value obtained by adding 1 to the entropy as word recognition reliability.

Figure 10:
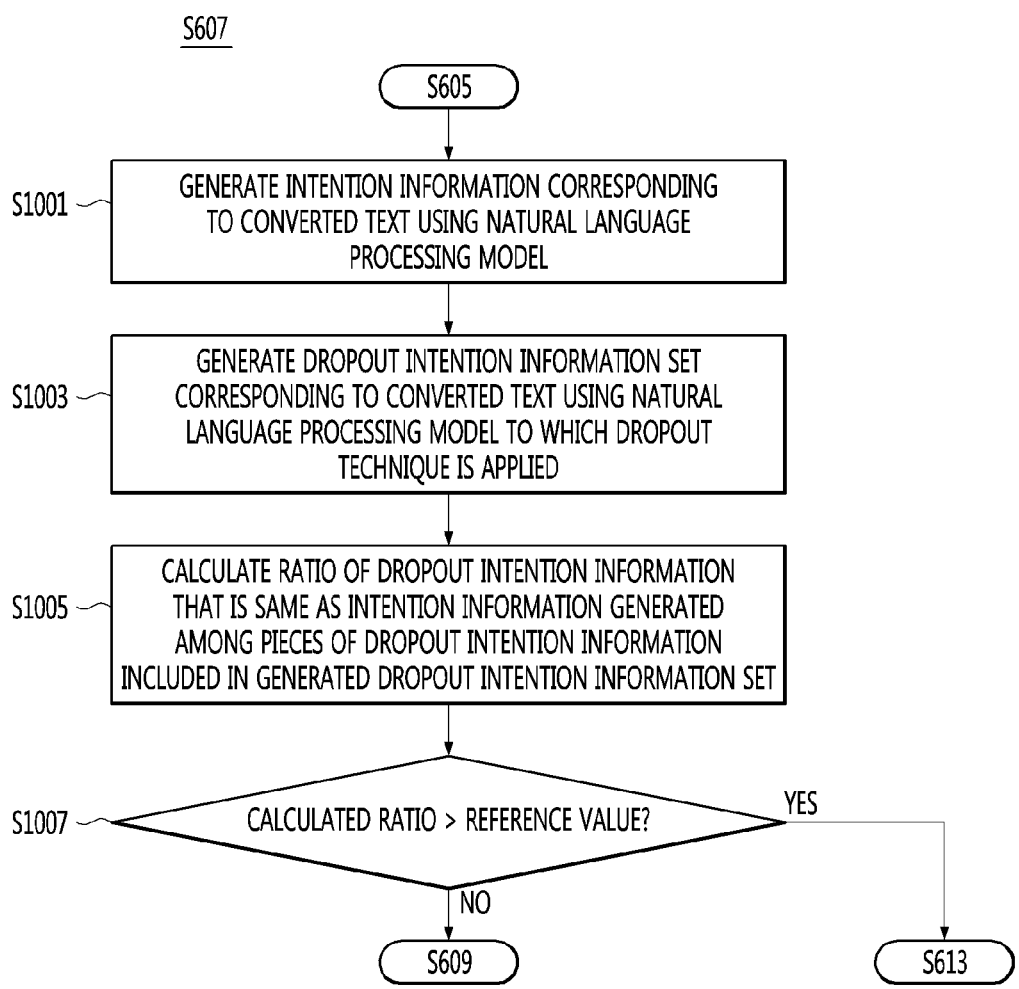
FIG. 10 is a flowchart illustrating an example of step S607 of determining whether a converted text is a normal sentence in FIG. 6.

FIG. 10 is a flowchart illustrating an example of step S607 of determining whether a converted text is a normal sentence in FIG. 6.

Referring to FIG. 10, the processor 180 of the AI apparatus 100 generates intention information corresponding to the converted text using the natural language processing model (S1001).

The processor 180 may convert the speech data into the text using the acoustic model and the language model, and grasp intention corresponding to the speech of the user by generating intention information corresponding to the converted text using the natural language processing model.

The processor 180 of the AI apparatus 100 generates a dropout intention information set corresponding to the converted text using the natural language processing model to which a dropout technique is applied (S1003).

The dropout technique or the Monte Carlo dropout technique may refer to a technique for inferring results in a state in which at least part of nodes constituting the artificial neural network are arbitrarily deactivated.

If the intention information corresponding to the converted text is generated using the natural language processing model, the processor 180 may generate dropout intention information corresponding to the converted text using the natural language processing model to which the dropout technique is applied. The processor 180 may generate the dropout intention information set by generating a predetermined number of dropout intention information by repeatedly applying the dropout technique a predetermined number of times. For example, if the processor 180 applies the dropout technique n times, the processor 180 may generate the dropout intention information set including n generated dropout intention information.

The processor 180 of the AI apparatus 100 calculates a ratio of the dropout intention information that is the same as the generated intention information among the dropout intention information included in the generated dropout intention information set (S1005).

The dropout intention information included in the dropout intention information set is intention information inferred in a state in which at least part of nodes constituting the natural language processing model are deactivated. That is, the dropout intention information may be different from the intention information generated using the natural language processing model to which the dropout technique is not applied. However, if the converted text input to the natural language processing model is a sentence that can be learned and processed in the natural language processing model, although the dropout technique is applied, it can be expected that most of the dropout intention information is output in the same manner as the intention information generated in a state in which the dropout technique is not applied. Therefore, the processor 180 may calculate a ratio of the dropout intention information that is the same as the intention information generated in a state in which the dropout technique is not applied among pieces of the dropout intention information included in the generated dropout intention information set.

For the sentence that is not sufficiently learned in the natural language processing model, the ratio that intent information generated using the natural language processing model to which the dropout technique is not applied is equal to dropout intent information will be lowered. This may mean that the converted text is "out of distribution" (OOD).

The processor 180 of the AI apparatus 100 determines whether the calculated ratio is greater than a reference value (S1007).

As the calculated ratio is larger, it means that there are a lot of dropout intention information that is the same as intent information generated using the natural language processing model to which the dropout technique is not applied, among pieces of the dropout intent information generated using the natural language processing model to which the dropout technique is applied. That is, as the calculated ratio increases, it may mean that the input converted text is a sentence sufficiently learned in the natural language processing model. Therefore, the processor 180 may determine that the converted text is a normal sentence if the calculated ratio is larger than a preset reference value.

If it is determined in step S1007 that the calculated ratio is not greater than the reference value, the processor 180 of the AI apparatus 100 performs step S609 illustrated in FIG. 6.

If it is determined in step S1007 that the calculated ratio is greater than the reference value, the processor 180 of the AI apparatus 100 performs step S613 illustrated in FIG. 6.

FIG. 11 is a view illustrating a dropout technique in an artificial neural network.

As illustrated in FIG. 11, the dropout technique is a technique used to prevent overfitting of an artificial neural network. The dropout technique may mean determining a result in a state in which nodes constituting the artificial neural network are arbitrarily excluded.

FIG. 11(*a*) shows an example of an object recognition model composed of all-connected artificial neural networks, and all nodes are connected.

FIG. 11(*b*) illustrates a state in which arbitrary nodes are excluded or deactivated by using the dropout technique with respect to the artificial neural network model of FIG. 11(*a*).

The structure of the artificial neural network illustrated in FIG. 11 is merely an example, and the present disclosure is not limited thereto.

Figure 12:
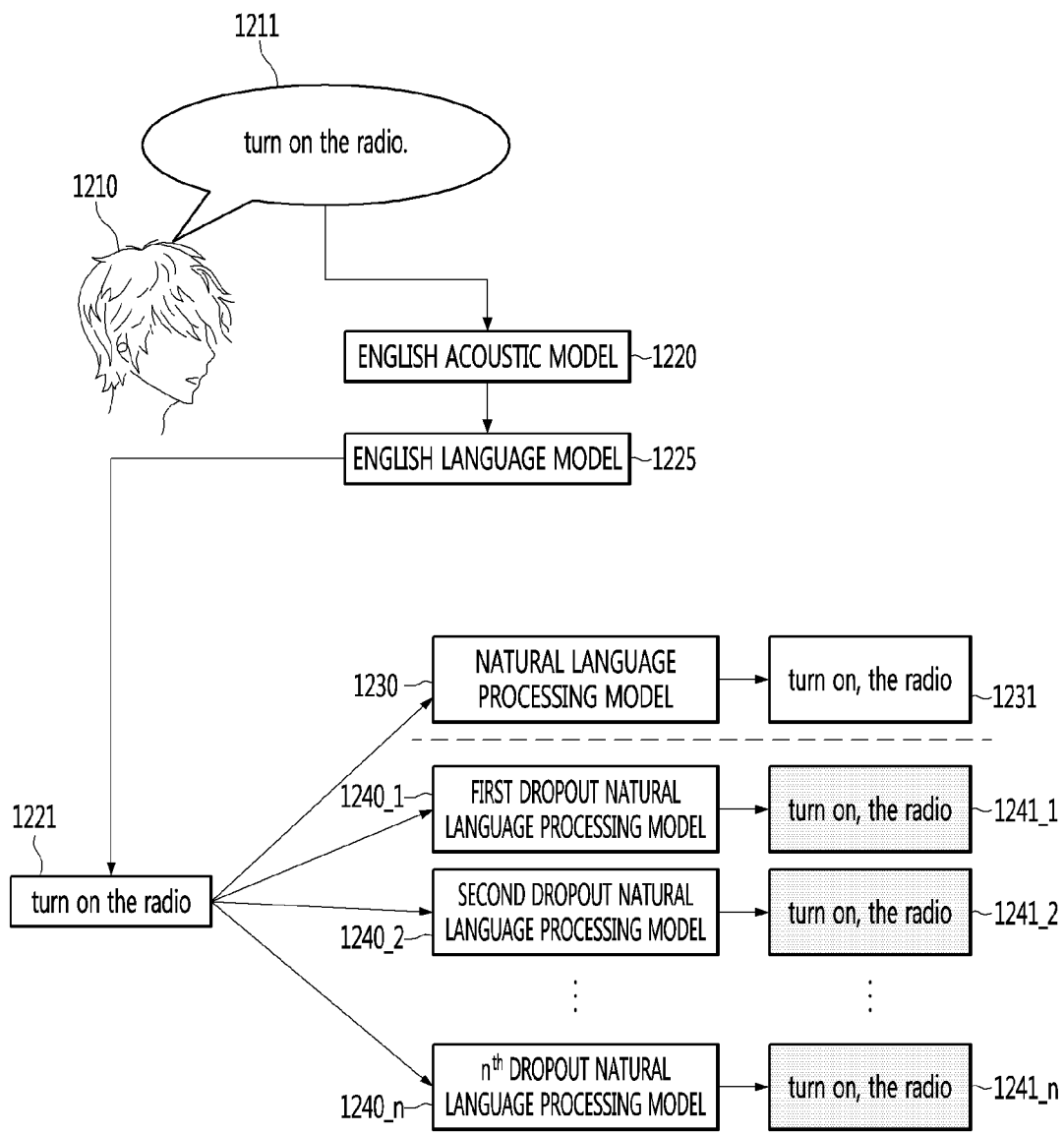
FIG. 12 is a view illustrating an example of determining whether a converted text is a normal sentence according to an embodiment of the present disclosure.

FIG. 12 is a view illustrating an example of determining whether a converted text is a normal sentence according to an embodiment of the present disclosure.

Referring to FIG. 12, a user 1210 utters "turn on the radio." 1211, the pronunciation of the user 1210 is accurate, and noise is not included during speech. The processor 180 of the AI apparatus 100 uses an English acoustic model 1220 and an English language model 1225 to accurately convert the speech 1211 of the user 1210 into "turn on the radio."

The English acoustic model 1220 and the English language model 1225 accurately convert the speech 1211 of the user 1210 into the text. Therefore, the converted text 1221 is a sentence that can clearly understand the meaning, and the natural language processing model 1230 may clearly determine and generate intention information corresponding to the converted text 1221. Therefore, the intention information 1231 that the processor 180 of the AI apparatus 100 generates from the converted text 1221 using the natural language processing model 1230 to which the dropout technique is not applied is "turn on" and "the radio", which are intention information actually suitable for the speech 1211 of the user 1210.

As described above, since the converted text 1221 is a sentence that can clearly understand the meaning, most of first to $n^{th}$ dropout intention information 1241_1 and 1241_2 to 1241_n generated by first to $n^{th}$ dropout natural language processing models 1240_1 and 1240_2 to 1240_n to which the dropout technique is applied to the natural language processing model 1230 are "turn on" and "the radio."

Therefore, among the first to $n^{th}$ dropout intention information 1241_1 and 1241_2 to 1241_n, the ratio of the same dropout intention information as the intention information 1231 generated using the natural language processing model 1230 to which the dropout technique is not applied will be high. In this case, the processor 180 may determine that the converted text 1221 is a normal sentence.

Figure 13:
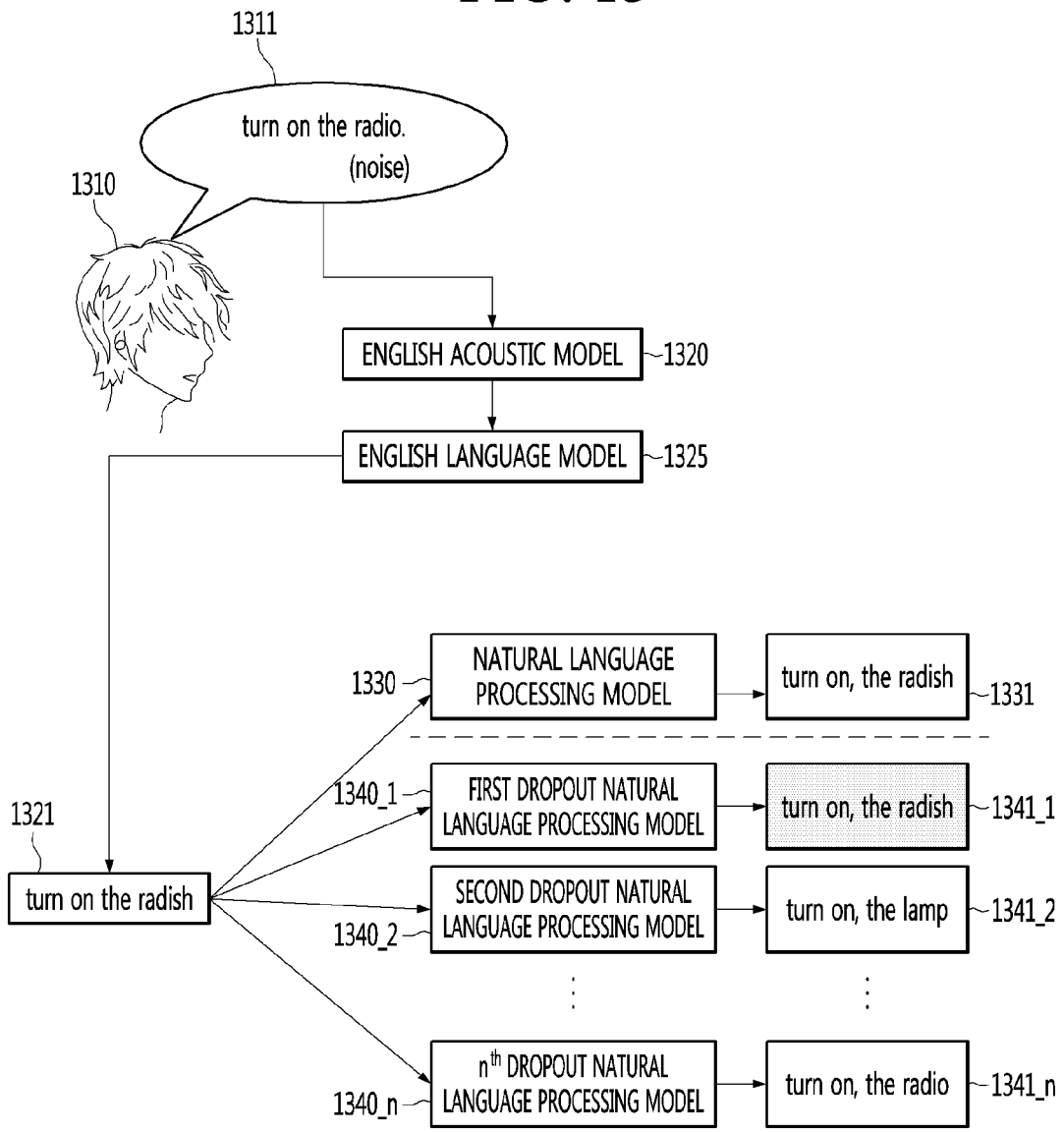
FIG. 13 is a view illustrating an example of determining whether a converted text is a normal sentence according to an embodiment of the present disclosure.

FIG. 13 is a view illustrating an example of determining whether a converted text is a normal sentence according to an embodiment of the present disclosure.

Referring to FIG. 13, a user 1310 utters "turn on the radio." (1311), and noise is included when the user 1310 utters a word "radio." The processor 180 of the AI apparatus 100 uses an English acoustic model 1320 and an English language model 1325 to inaccurately convert the speech 1311 of the user 1310 into "turn on the radish."

The English acoustic model 1320 and the English language model 1325 inaccurately convert the speech 1311 of the user 1310 into the text. Therefore, the converted text 1321 is a sentence that cannot clearly understand the meaning, and the natural language processing model 1330 cannot clearly determine and generate intention information corresponding to the converted text 1321. Therefore, the intention information 1331 that the processor 180 of the AI apparatus 100 generates from the converted text 1321 using the natural language processing model 1330 to which the dropout technique is not applied is "turn on" and "the radish", which are intention information actually unsuitable for the speech 1311 of the user 1310.

As described above, since the converted text 1321 is a sentence that cannot clearly understand the meaning, most of first to $n^{th}$ dropout intention information 1340_1 to 1340_n generated by first to $n^{th}$ dropout natural language processing models 1341_1 to 1341_n to which the dropout technique is applied to the natural language processing model 1330 may have different values. That is, the first dropout intention information 1341_1 is "turn on" and "the radish" and is the same as the intention information 1331 generated using the natural language processing model 1330 to which the dropout technique is not applied. However, since the second dropout intent information 1341_2 is "turn on" and "the lamp", and the $n^{th}$ dropout intent information 1341_n is "turn on" and "the radio", they are different from the intention information 1331 generated using the natural language processing model 1330 to which the dropout technique is not applied.

Therefore, among the first to $n^{th}$ dropout intention information 1341_1 to 1341_n, the ratio of the same dropout intention information as the intention information 1331 generated using the natural language processing model 1330 to which the dropout technique is not applied will be low. In this case, the processor 180 may determine that the converted text 1321 is an abnormal normal sentence.

Figure 14:
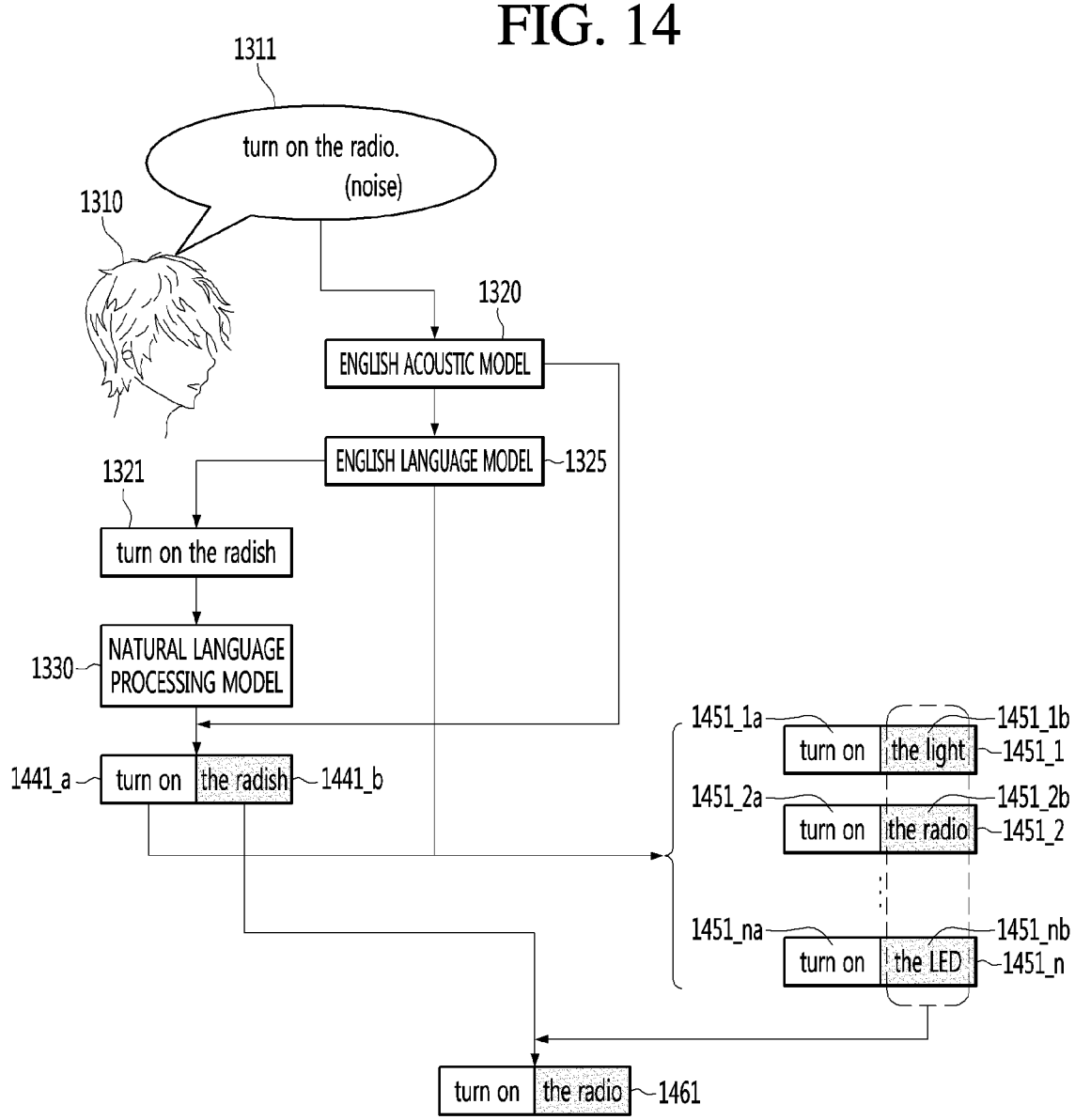
FIG. 14 is a view illustrating an example of correcting misrecognized word in the example illustrated in FIG. 13.

FIG. 14 is a view illustrating an example of correcting misrecognized word in the example illustrated in FIG. 13.

In the example of FIG. 13, the processor 180 of the AI apparatus 100 converts the speech 1311 of the user 1310 into the text "turn on the radish" using the English acoustic model 1320 and the English language model 1325, but grasps that the text 1321 converted using the natural language processing model 1330 is an abnormal sentence.

Referring to FIG. 14, if it is determined that the converted text 1321 is an abnormal sentence, the processor 180 of the AI apparatus 100 may use the English acoustic model 1320 to distinguish a normal recognition region 1441_a and a misrecognition region 1441_b with respect to the converted text 1321 based on the word recognition reliability calculated using the English acoustic model 1320.

The processor 180 of the AI apparatus 100 may use the English language model 1325 to select sentences 1451_1 to 1451_n whose similarity to the normal recognition region 1441_a of the converted text 1321 is equal to or greater than a reference value among the previously learned sentences. In particular, the processor 180 may select sentences 1451_1 to 1451_n whose similarity to the normal recognition region 1441_a of the converted text 1321 is equal to or greater than the reference value among the sentences related to the functions that can be performed by the AI apparatus 100 or the sentences included in the speech record of the user 1310. The regions 1451_1a to 1451_na corresponding to the normal recognition region 1441_a of the converted text 1321 of the selected sentences 1451_1 to 1451_n are identical to or similar to the normal recognition region 1441_a.

The first sentence 1451_1 may be "turn on the light", the second sentence 1451_2 may be "turn on the radio", and the $n^{th}$ sentence 1451_n may be "turn on the LED". The regions 1451_1a to 1451_na corresponding to the normal recognition region 1441_a of the converted text 1321 of the selected sentences 1451_1 to 1451_n may be all "turn on" and may be identical to "turn on", which is the normal recognition region 1441_a of the converted text 1321.

The processor 180 of the AI apparatus 100 may determine the most similar sentence 1461 by comparing the regions 1451_1b to 1451_nb corresponding to the misrecognition region 1441_b of the converted text 1321 of the selected sentences 1451_1 to 1451_n with the misrecognition region 1441_b of the converted text 1321, and may replace the sentence 1461 determined to be the most similar with the converted text 1321.

As a result of comparing the regions 1451_1b to 1451_nb corresponding to the misrecognition region 1441_b of the converted text 1321 with the misrecognition region 1441_b "the radish" of the converted text 1321, the sentence 1461 most similar to the converted text 1321 among the first sentence 1451_1 to the $n^{th}$ sentence 1451_n may be determined as the second sentence 1451_2 "turn on the radio."

Although not illustrated in FIG. 14, as another example, it is assumed that the user 1310 utters "take three selfies.", but noise is included in the word "selfies." In this case, the English acoustic model 1320 may inaccurately recognize the phonemes corresponding to the word "selfies" due to noise, therefore, the English acoustic model 1320 and the English language model 1325 may inaccurately convert the speech into the text "take three jellies." The processor 180 may calculate word recognition reliability for each word using the English acoustic model 1320, grasp that the word recognition reliability of the word "jellies" has been calculated to be low, and determine the word "jellies" as an uncertainly recognized word.

The processor 180 may determine whether the converted text "take three jellies" is a normal sentence using the dropout technique and the natural language processing model 1330, but since it is the sentence that cannot understand the meaning, the processor 180 may determine the converted text as an abnormal sentence. The processor 180 may distinguish the converted text "take three jellies" from the normal recognition region "take three" and the misrecognition region "jellies."

The processor 180 may select sentences similar to the normal recognition region "take three" among the sentences previously learned with respect to the English language model 1325, particularly, among sentences related to the function that can be performed by the AI apparatus 100 or the sentences included in the speech record of the user 1310. For example, since the AI apparatus 100 has the function of capturing an image using a camera, the processor 180 may select sentences "take three photos", "take three selfies", "take three pictures", "take three videos", and "take threes panorama pictures" related to the function of using the camera.

The processor 180 may correct the misrecognized word by determining the sentence "take three selfies" which is most similar to the misrecognition region "jellies" among the selected sentences "take three photos", "take three selfies", "take three pictures", "take three videos", and "take threes panorama pictures", and replacing the converted text "take three jellies" with the determined sentence "take three selfies." The processor 180 may generate intention information about the sentence "take three selfies" in which the misrecognized word is corrected, and perform a control corresponding to the generated intention information.

According to various embodiments of the present disclosure, since it is possible to determine that speech has been misrecognized in the acoustic model, a problem of the uttered speech or the acoustic model may not be mistaken as a problem of the language model or the natural language processing model.

In addition, according to various embodiments of the present disclosure, it is possible to infer a user's speech with high accuracy by determining the misrecognized word in the acoustic model and correcting the misrecognized word by using well-recognized words.

According to an embodiment of the present disclosure, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

Other implementations are within the scope of the following claims.

What is claimed is:

1. An artificial intelligence apparatus for recognizing speech by correcting misrecognized word, comprising:
a microphone; and
a processor configured to:
obtain, via the microphone, speech data including speech of a user;
convert the speech data into text by using an acoustic model and a language model;
determine whether an uncertain recognition exists in an acoustic recognition result according to the acoustic model;
based on a determination that the uncertain recognition exists in the acoustic recognition result, determine whether the converted text is a normal sentence by:
generating intention information from the converted text by using a natural language processing model,
generating a dropout intention information set from the converted text by applying a dropout technique to the natural language processing model, and
determining a ratio of dropout intention information that is the same as the generated intention information among pieces of dropout intention information included in the dropout intention information set, wherein the converted text is determined to be a normal sentence based on the determined ratio,
determine a sentence most similar to the converted text among sentences pre-trained by using the language model based on a determination that the converted text is not a normal sentence, and
replace the converted text with the determined most similar sentence based on the determination that the converted text is not the normal sentence; and
generate a speech recognition result corresponding to the speech data by using the converted text based on at least one of a determination that the uncertain recognition does not exist in the acoustic recognition result, a determination that the converted text is a normal sentence, or a determination that the determined ratio is greater than a second reference value.

2. The artificial intelligence apparatus according to claim 1, wherein the processor is further configured to:
determine probabilities corresponding to each phoneme for each predetermined window unit with respect to the speech data by using the acoustic model;
determine a word recognition reliability for each word included in the speech data by using at least one of a largest probability value (p1) among the determined probabilities, a difference (p1−p2) between the largest probability value (p1) and a second largest probability value (p2) among the determined probabilities, or an entropy corresponding to the determined probabilities; and
determine whether an uncertain recognition exists in the acoustic recognition result based on the determined word recognition reliability.

3. The artificial intelligence apparatus according to claim 2, wherein the processor is further configured to:
determine an average of p1 or an average of p1−p2 corresponding to phonemes included in a word for each word; and
determine the determined average as the word recognition reliability of the corresponding word.

4. The artificial intelligence apparatus according to claim 2, wherein the processor is further configured to distinguish words included in the speech data from each other based on a blank or a silence.

5. The artificial intelligence apparatus according to claim 2, wherein the processor is further configured to determine, as an uncertainly recognized word, a word whose determined word recognition reliability is smaller than a first reference value among the words.

6. The artificial intelligence apparatus according to claim 1, wherein the processor is further configured to determine that the converted text is a normal sentence based on the determined ratio being greater than the second reference value.

7. The artificial intelligence apparatus according to claim 1, wherein the processor is further configured to:
divide the converted text into a normal recognition region and a misrecognition region based on a word recognition reliability determined for each word based on a determination that the converted text is not a normal sentence;
select sentences similar to the normal recognition region among sentences pre-trained by using the language model;
determine a sentence most similar to the misrecognition region among the selected sentences; and
replace the converted text with the determined sentence.

8. The artificial intelligence apparatus according to claim 7, wherein the processor is further configured to determine, as a word included in the misrecognition region, words whose determined word recognition reliability is smaller than a third reference value among the words.

9. The artificial intelligence apparatus according to claim 7, wherein the processor is further configured to use the language model to determine a sentence most similar to the converted text among sentences related to a function supported by the artificial intelligence apparatus or sentences included in a speech log based on a determination that the converted text is not a normal sentence.

10. The artificial intelligence apparatus according to claim 1, wherein at least one of the acoustic model, the language model, or the natural language processing model is configured to include an artificial neural network and is trained using a machine learning algorithm or a deep learning algorithm.

11. A method for recognizing speech by correcting misrecognized word, comprising:
obtaining, via a microphone, speech data including speech of a user;
converting the speech data into text by using an acoustic model and a language model;
determining whether an uncertain recognition exists in an acoustic recognition result according to the acoustic model;
based on a determination that the uncertain recognition exists in the acoustic recognition result, determining whether the converted text is a normal sentence by:
generating intention information from the converted text by using a natural language processing model,
generating a dropout intention information set from the converted text by applying a dropout technique to the natural language processing model, and
determining a ratio of dropout intention information that is the same as the generated intention information among pieces of dropout intention information included in the dropout intention information set, wherein the converted text is determined to be a normal sentence based on the determined ratio, determining a sentence most similar to the converted text among sentences pre-trained by using the language model based on a determination that the converted text is not a normal sentence, and replacing the converted text with the determined most similar sentence based on the determination that the converted text is not the normal sentence; and generating a speech recognition result corresponding to the speech data by using the converted text based on at least one of a determination that the uncertain recognition does not exist in the acoustic recognition result, a determination that the converted text is a normal sentence, or a determination that the determined ratio is greater than a second reference value.

12. A non-transitory recording medium storing a program for a processor to perform a method for recognizing speech by correcting misrecognized word, the method comprising:

obtaining, via a microphone, speech data including speech of a user;

converting the speech data into text by using an acoustic model and a language model;

determining whether an uncertain recognition exists in an acoustic recognition result according to the acoustic model;

based on a determination that the uncertain recognition exists in the acoustic recognition result, determining whether the converted text is a normal sentence by:

generating intention information from the converted text by using a natural language processing model, generating a dropout intention information set from the converted text by applying a dropout technique to the natural language processing model, and determining a ratio of dropout intention information that is the same as the generated intention information among pieces of dropout intention information included in the dropout intention information set, wherein the converted text is determined to be a normal sentence based on the determined ratio, determining a sentence most similar to the converted text among sentences pre-trained by using the language model based on a determination that the converted text is not a normal sentence, and replacing the converted text with the determined most similar sentence based on the determination that the converted text is not the normal sentence; and generating a speech recognition result corresponding to the speech data by using the converted text based on at least one of a determination that the uncertain recognition does not exist in the acoustic recognition result, a determination that the converted text is a normal sentence, or a determination that the determined ratio is greater than a second reference value.

* * * * *